Oct. 17, 1967 B. A. HOLMBERG 3,347,984

ELECTRONIC DROPOUT SUPPRESSOR

Filed June 22, 1962

INVENTOR
BERTEN A. HOLMBERG
Carpenter, Abbott, Coulter & Kinney
ATTORNEYS

United States Patent Office 3,347,984

Patented Oct. 17, 1967

3,347,984
ELECTRONIC DROPOUT SUPPRESSOR

Berten A. Holmberg, Hutchinson, Minn., assignor to Minnesota Mining and Manufacturing Company, St. Paul, Minn., a corporation of Delaware Filed June 22, 1962, Ser. No. 204,568
17 Claims. (Cl. 178—6.6)

This application is a continuation-in-part of my copending application Ser. No. 122,912 filed July 10, 1961, and now abandoned.

This invention is primarily concerned with the suppression of dropouts in the transmission and reproduction of magnetically recorded television signals. The invention is also applicable to other information transmission or storage systems where defects in the information can be detected by electronic means, although its main utility resides in systems where the information is substantially repetitive in nature.

A major problem in the recording of television signals on magnetic recording tape stems from signal dropouts on playback due to malfunctions of the recording or playback apparatus, or due to debris accumulated by the tape in use, or flaws in the tape such as craters or scratches of foreign particles in the magnetizable coating, or clumps of magnetic oxide, or backing protrusions. Because the streaks in the picture caused by signal dropouts are disturbing to the viewer, a great deal of effort has been expended in the industry to minimize dropouts to provide a more perfect television picture. Except for multifold improvement in the tape, little advance has been made, with the result that the picture quality still does not meet the desired requirements of video tape users.

This invention provides an economical device for suppressing dropouts in television recording to produce an almost visually perfect picture. With the addition of very modest circuitry, the invention can be applied to video tape recorders now in widespread commercial use. In a conventional video recorder which uses frequency modulation, this may be accomplished by sensing defects or dropouts in the television radio frequency signal played back from the tape, dividing this signal into two identical components; delaying one component with respect to the other by an interval equal to one scan period; normally transmitting only one of said components; and transmitting the other of the two components in place of the defective normally-transmitted component in the event that a defect or dropout is sensed. Because a television signal in a given scan period is essentially equivalent to the signal in time-adjacent scan periods, the viewer is generally unaware of the substitution. Somewhat less effectively, the substitution could be made from a scan period 2 or 3 lines timewise ahead or behind the signal dropout or from a physically adjacent scan one field away or even from the corresponding scan period one frame away. In the present state of the art, it is most economical to substitute the time-adjacent scan period, so that in a monochrome television system, one component of the signal is delayed 63.5 microseconds with respect to the other.

The present invention is equally applicable to color television but for simplicity is described herein in conjunction with monochrome television.

Since devices for delaying a television signal one scan period or 63.5 microseconds may distort the signal slightly, it is preferred that the relatively undelayed component be normally transmitted. In this case, the normally-transmitted signal should be delayed momentarily to compensate for the time delay inherent in sensing a dropout. Upon sensing a dropout, the transmission is immediately switched to the signal component which has been delayed 63.5 microseconds with respect to the other, and this component is transmitted for the duration of the dropout, at which time the relatively undelayed component is again transmitted. Since a dropout rarely exceeds 63.5 microseconds in duration and since there is no difficulty in keeping the number of dropouts statistically small with respect to number of scan periods, the substituted information constitutes a very minor proportion and does not detract from the overall quality of the video picture. By keeping the switching operation from one signal component to the other very short, the switching dots do not ordinarily disturb the viewer. Since the degree of visibility of the switching dots is in part dependent upon phase differences between the two signal components, the degree of this visual disturbance can be minimized by automatic phase control.

The instant invention will be readily understood from the following description of certain preferred embodiments in conjunction with the accompanying drawing wherein.

Figure 1:
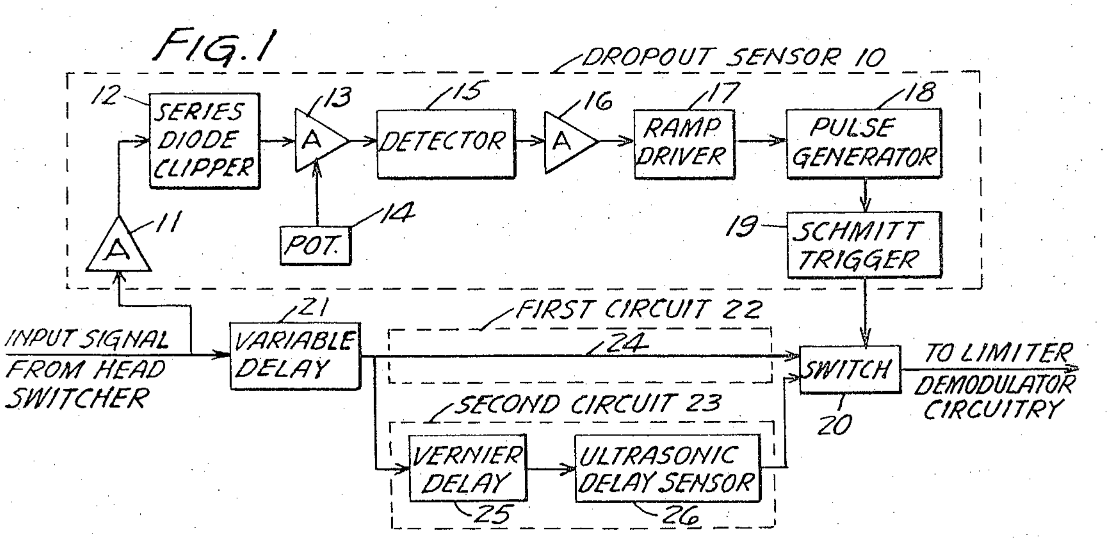
FIG. 1 is a block diagram of circuitry in accordance with one form of the invention adapted for installation in a video tape recorder.

Referring to FIG. 1 of the drawing, the frequency modulated radio frequency signal from the head switcher of a conventional video tape recorder is fed into a dropout sensor or level detector 10 which utilizes solid state components and is designed to generate a pulse when the amplitude of the radio frequency signal drops below a determined level (that is, when a dropout occurs). The radio frequency signal is first applied to a voltage amplifier 11 and then to a series diode clipper 12 which passes only the positive signal components to an amplifier 13 whose gain is controlled by a potentiometer 14. The amplified signal components are applied to a detector 15 comprised of a tunnel diode in a bi-stable circuit which produces an output pulse train of constant amplitude at the frequency of the applied signal components when driven above a fixed level, but which has no output when driven below that fixed level (that is, during a dropout). The pulse train is fed to a voltage amplifier 16, a ramp driver 17 and a pulse generator 18 which integrates the pulse train but is driven into saturation when there is a break in the pulse train, producing a positive output pulse which is wider than the original dropout because of the time required for the pulse generator transistor to recover from saturation. A Schmitt trigger 19 squares the widened pulse to operate an electronic switch 20.

The dropout sensor 10 may be adjusted by the operator by setting the potentiometer 14 to feed a square pulse to the electronic switch 20 when the radio frequency signal amplitude drops below a certain level. In other words, the operator adjusts the potentiometer 14 to produce switching pulses upon the occurrence of dropouts which he finds to be visually disturbing.

The radio frequency signal from the head switcher is also fed into a variable delay 21 which is adjustable for time delays up to at least the maximum delay inherent in the dropout sensor 10, for example, in the order of one microsecond. The output from the variable delay 21 feeds two circuits 22 and 23, the first of which is a simple connection 24 to the electronic switch 20. The second circuit 23 includes an ultrasonic delay line system 25 of quartz with transducers and amplifiers to provide a fixed delay of about 62.5 microseconds. A useful quartz delay line which passes the normal radio frequency components in a video tape recorder is available from Andersen Laboratories, West Hartford, Conn. The circuit 17 also includes a vernier delay 25 to adjust the total delay in the second circuit 23 to equal the duration of one scan period, that is, 63.5 microseconds.

The switch 20 may be an essentially conventional device of a type normally used for television broadcast effects switching and for keyed insertion of program material, with emphasis on short switching time and elimination of incidental or generated switching transients, but it need have essentially flat response only for a bandwidth of about 1 to 8 megacycles. Normally the switch 20 transmits to the limiter demodulator circuitry of the video tape recorder the radio frequency signal carried by the first circuit 22. Then upon occurrence of a dropout, the switching pulse output of the Schmitt trigger 19 causes the switch 20 to transmit the delayed radio frequency signal carried by the second circuit 23 in place of the first-circuit signal for the duration of the switching pulse, after which the switch 20 returns to normal. By proper adjustment of the potentiometer 14, the video information carried by the delayed radio frequency signal is substituted in the video picture for every visually disturbing dropout. With the variable delay 21 adjusted to overcompensate for delay inherent in the dropout sensor 10, the signal carried by the first circuit 22 is again at a proper level when the switch 20 returns to normal since the dropout sensor 10 also inherently widens the switching pulse.

If a dropout exceeds 63.5 microseconds in duration or two dropouts occur at an interval of 63.5 microseconds, some disturbance will appear in the video picture. In the present state of the video recording art, such occurrences are statistically rare.

Since the delayed signal is essentially equivalent to and only occasionally substituted for the normally-transmitted signal for a fraction of a scan period, viewers of the transmitted video picture are generally unaware of any substitution. On the other hand, displayed dropouts are visually disturbing, and the present invention provides a simple, economical way of eliminating this disturbance.

Figure 2:
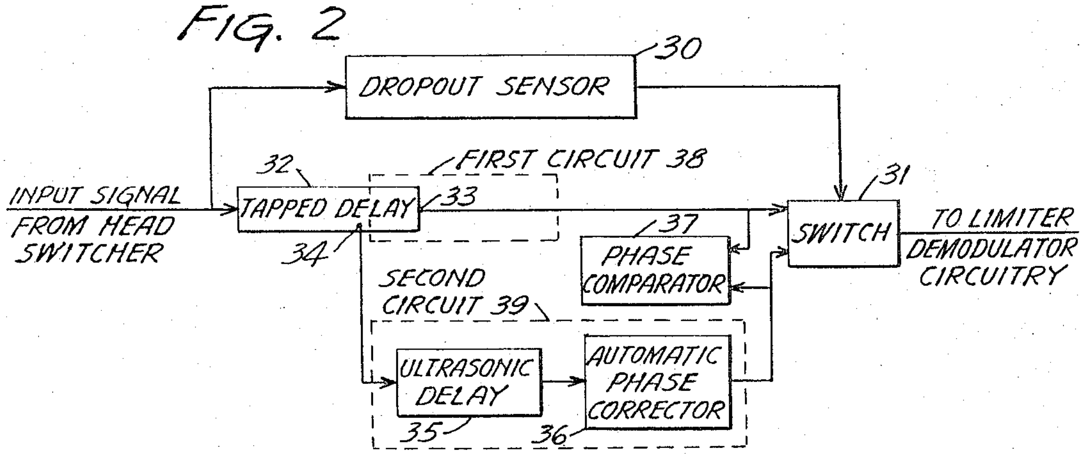
FIG. 2 is a block diagram of circuitry illustrating certain modifications which may be made in a device such as that illustrated in FIG. 1.

An alternative device for suppressing defects in video scan periods is illustrated in FIG. 2. Here the radio frequency signal from the head switcher is applied to a dropout sensor 30, the output of which controls an electronic switch 31. These devices may be identical to their counterparts in FIG. 1. The radio frequency signal from the head switcher also is fed into a tapped delay line 32 which provides a total delay of about one microsecond. The main output 33 of the tapped delay 32 is connected directly to the switch 31, while the tapped output 34 feeds an ultrasonic delay system 35 which includes a quartz delay line providing a delay of 63.5 microseconds. The tapped output 34 is adjusted to compensate for delay inherent in circuitry associated with the quartz delay line to delay the signal from the tapped output 34 one scan period with respect to the signal from the main output 33. However, these two signals tend to vary in phase due to minute variations in head-to-tape-speed, frequency instability, etc., and if both were applied directly to the electronic switch 31, switching dots in the video picture might be visible, the degree of vsibility being in part dependent upon the difference in phase. To minimize such visual disturbance, the output of the ultrasonic delay system 35 is fed to an automatic phase corrector 36 which is controlled by a phase comparator 37 at which the phases of the delayed and the relatively undelayed radio frequency signals are compared. The automatic phase corrector 36 then delays the signal output from the ultrasonic delay system 35 sufficiently to keep this signal in phase with the relatively undelayed signal.

It will be seen that the device illustrated in FIG. 2 comprises a first circuit 38 (consisting of the portion of the tapped delay line 32 beyond the tapped output 34) for carrying a radio frequency television signal; a second circuit 39 (consisting of the ultrasonic delay system 35 and the automatic phase corrector 36) for carrying the radio frequency signal which is delayed one scan period with respect to the first-circuit signal; a dropout sensor 30 for sensing a drop in amplitude of the radio frequency signal below a determined level; and an electronic switch 31 which normally transmits only the first-circuit signal and is controlled by the dropout sensor 30 for transmitting portions of the second-circuit signal in place of defective portions of the first-circuit signal. As in the device illustrated in FIG. 1, only those portions of the second-circuit signal which correspond in time position to defective portions of the first-circuit signal are transmitted.

Figure 3:
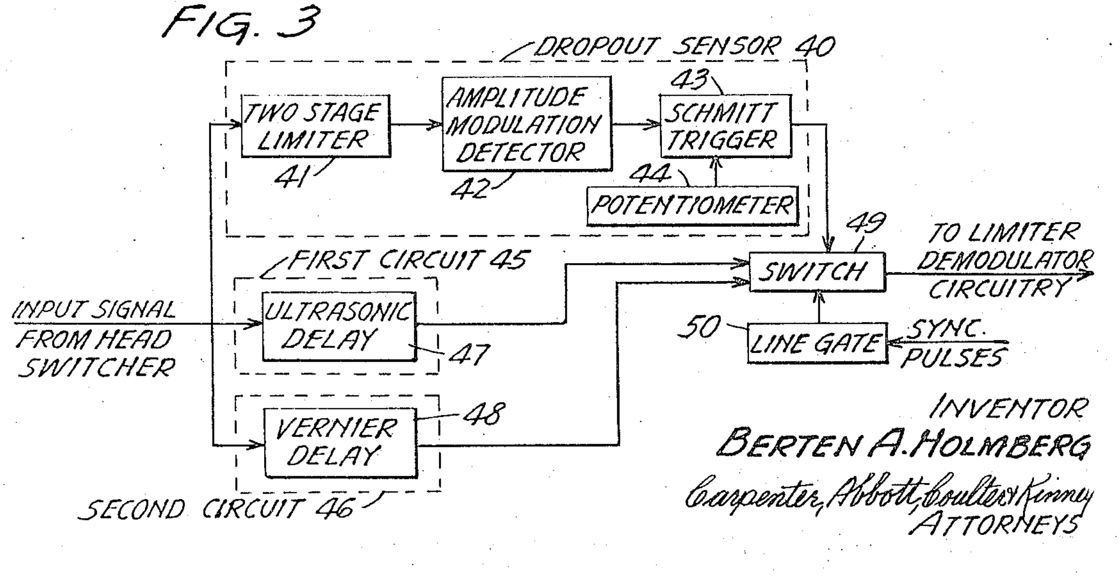
FIG. 3 is a block diagram of circuitry embodying another form of the invention.

Reference is now made to FIG. 3 which illustrates circuitry for substituting whole scan periods whenever a defect is sensed. The radio frequency signal from the head switcher is fed into a dropout sensor 40, which may be identical to the dropout sensor 10 of FIG. 1, but since the switching operation does not occur until the end of the scan period, speed in the detection of dropouts is not important. The dropout sensor 40 includes a two-stage amplified diode limiter 41 which eliminates small variations in signal amplitude due to multiple head factors; a peak-to-peak amplitude modulation detector 42 which converts a radio frequency signal dropout not absorbed by this limiter 41 into a positive pulse, the amplitude of which is a function of the degree of signal failure; a Schmitt trigger 43 which squares the positive pulse; and a potentiometer 44 for controlling the triggering level. The radio frequency signal input from the head switcher also feeds two circuits 45 and 46, the first of which includes an ultrasonic delay line system 47 to provide a fixed delay of about 64.5 microseconds. The second circuit 46 includes a vernier delay 48 to adjust the relative delay in the signal carried by the first circuit 45 with respect to that carried by the second circuit 46 to equal the duration of one scan period, that is, 63.5 microseconds in monochrome television.

The radio frequency signals carried by circuits 45 and 46 are applied to an electronic switch 49, which normally transmits to the limiter demodulator circuitry of the video tape recorder the relatively delayed signal carried by the first circuit 45. Then upon occurrence of a dropout, the output of the dropout sensor enables the switch 49 to switch at the occurrence of the next horizontal sync pulse under the control of a line gate 50 to transmit to the limiter demodulator circuitry the signal carried by the second circuit 46 in place of the defective signal in the first circuit 45 for a full scan period.

Since the switching operation in the device illustrated in FIG. 3 takes place only while the picture is blanked between scan lines, the design of the switch 49 is less critical than that of switch 20. However, since the normally-transmitted signal is delayed for a full scan period, the performance of the ultrasonic delay system 47 must be exceptionally good if the quality of the transmitted video picture is to be as good as that transmitted by the device of FIG. 1. Moreover, since dropouts often occur at the end of one scan period and extend into the time-adjacent scan period but seldom continue for as long as 63.5 microseconds, the device of FIG. 1 has been found to provide superior dropout suppression, without regard to whether the ultrasonic delay system introduces noticeable distortion.

It is of critical importance in the suppression of signal defects in the practice of this invention that the substitution for the defective signal be made at radio frequency. In the reproduction of magnetically recorded television signals, this requires that the substitution be made before demodulation. Because the signal is still in frequency modulated form it is essentially not altered in character upon passing through an ultrasonic delay system. On the other hand, if the signal were first demodulated, the electronic switch would require an extremely sophisticated design, with added circuitry such as driven clamps in order to maintain accurate DC balance. Otherwise, rapid amplitude changes such as are caused by a splice in video tape may cause low frequency bounce which would prevent effective match of grey scale of the delayed and relatively undelayed signal components. Because dropouts tend to be relatively concentrated in the vicinity of a splice, the visual result could be quite disturbing.

Since an electronic switch for a frequency modulated radio frequency signal need not pass signals of low frequencies, it may be of less sophisticated and hence of less expensive design than that needed for demodulated signals. On the other hand, the switching of the radio frequency signal is more sensitive to phase differences, although this is rather easily controlled as illustrated in FIG. 2.

For use with video tape recorders now on the market, switching in the radio frequency mode has the special advantage that the delay lines may be fixed and yet the novel dropout suppressor can be interchanged on all video recorders. Such would not be the case if the signal substitution were not made until after demodulation since different models of video recorders have different demodulator delay times.

In preparing copies of video tape recordings, it is fairly common to transmit the radio frequency signal reproduced from the master tape directly to the recorder being used to make the copy, without demodulating the signal except to monitor the operation. Limiting of the signal during this procedure would effectively prevent subsequent detection of dropouts in the signal from the master tape so that the video recorder used for the master tape should be equipped with the instant novel electronic dropout suppressor. In this case it is virtually essential that the dropout suppressor operate on the radio frequency signal.

As will be apparent to those skilled in the art, the ultrasonic delay line system may be replaced by other delay means. For example, each reproducing head of the video tape recorder can be replaced by a dual head, the gaps of which are so spaced that the signal reproduced at one gap follows that reproduced at the other gap by about the time interval of one scan period. For video tape recorders now on the market, the gaps should lie about 0.099 inch (2.5 mm.) apart for 63.5 microseconds delay.

Although this invention is primarily intended for use in video recorders wherein a frequency modulated radio frequency signal is involved, it is applicable to other systems which also have a continuous carrier signal. For example, the present invention may be used in television receivers in the home to suppress such picture interference as falls outside of normal carrier amplitude variations, that is, whiter than white or blacker than black. In such use, signals falling outside the normal standardized carrier amplitude variation would be treated as dropouts and would be replaced by signals of a time-adjacent scan period.

What is claimed is:

1. A device for suppressing defects in a radio frequency signal, said device comprising: means for sensing defects in said radio frequency signal; first and second circuits for carrying said radio frequency signal; means for delaying the radio frequency signal in one of said circuits with respect to the signal in the other of said circuits for a time such that the delay signal is essentially equivalent to the relatively undelayed signal; means for normally transmitting only the radio frequency signal carried by said first circuit; and switching means controlled by said defect sensing means for transmitting only the radio frequency signal carried by said second circuit when a defect is sensed.

2. A device for suppressing defects in a radio frequency television signal comprising scan periods, said device comprising: means for sensing defects in said radio frequency signal; first and second circuits for carrying said radio frequency signal; means for delaying the radio frequency signal in one of said circuits with respect to the signal in the other of said circuits for an interval of $n$ times the period of the scan, where $n$ is an integer and the signal which occurs $n$ periods following a given scan period is essentially equivalent to the signal in said scan period; means for normally transmitting only the first-circuit signal; and switching means controlled by said defect sensing means for transmitting only the signal carried by the second circuit in the event that a defect is sensed.

3. A device for suppressing defects in a radio frequency television signal as defined in claim 2 wherein said delaying means is in said first circuit and wherein the switching means transmits the second-circuit signal in place of the first-circuit signal for a full scan period whenever a defect is sensed.

4. A device for suppressing defects in a radio frequency television signal as defined in claim 2 wherein the switching means transmits only the portions of the second-circuit signal which correspond in time position to defective portions of the first-circuit signal.

5. A signal defect suppressing device as defined in claim 2 wherein the interval $n$ is one.

6. In the radio frequency carrier portion of a system for transmitting and reproducing a magnetically recorded television signal comprising scan periods, a device for suppressing defects in the signal, said device comprising: a dropout sensor for detecting a drop in amplitude of the radio frequency signal below a determined level and thereupon generating a switching pulse; first and second circuits for carrying said radio frequency signal; a first delay line for delaying the radio frequency signal fed into said first and second circuits to compensate for delay inherent in the dropout sensor; an ultrasonic delay line in said second circuit for delaying its signal with respect to the signal carried by the first circuit for an interval of one period of the scan; and an electronic switch for normally transmitting only the radio frequency signal carried by the first circuit and controlled by switching pulses of said dropout sensor for transmitting portions of the second-circuit signal in place of defective portions of the first-circuit signal.

7. In the radio frequency carried portion of a system for transmitting and reproducing a magnetically recorded television signal comprising scan periods, a device for suppressing defects in the signal, said device comprising: a dropout sensor for detecting a drop in amplitude of the radio frequency signal below a determined level; first and second circuits for carrying said radio frequency signal; an ultrasonic delay line in said first circuit for delaying its signal with respect to the signal carried by the second circuit for an interval of one period of the scan; and an electronic switch for normally transmitting only the radio frequency signal carried by the first circuit and controlled by said dropout sensor for transmitting the next full scan line carried by the second circuit in place of the delayed scan line carried by the first circuit whenever a defect is sensed.

8. The method of suppressing defects in a radio frequency signal comprising the steps of: sensing defects in said radio frequency signal; dividing said radio frequency signal into two identical radio frequency signal components; delaying one of said signal components with respect to the other for a time such that the delayed signal component is essentially equivalent to the relatively undelayed signal component; normally transmitting only one of said signal components; and in the event a defect is sensed, transmitting in place of the defective normally-transmitted signal component the other of said signal components.

9. A method of suppressing defects in the transmission of a radio frequency television signal comprising scan periods, said method comprising the steps of: sensing defects in the said radio frequency signal; dividing the said radio frequency signal to provide two identical radio frequency signal components; delaying one of said signal components with respect to the other for an interval of $n$ times the period of the scan, where $n$ is an integer and the signal component $n$ periods following a given signal component is essentially equivalent to said given signal component; normally transmitting only one of said two identical signal components; and in the event a defect is sensed, transmitting in place of the defective normally-transmitted signal component the other of said two signal identical components.

10. The method of suppressing defects in a radio frequency signal as defined in claim 9 wherein the interval $n$ is one.

11. The method of suppressing defects in a radio frequency television signal comprising scan periods, said method comprising the steps of: detecting a drop in amplitude of said radio frequency television signal below a determined level; dividing said radio frequency signal to provide two identical radio frequency signal components; delaying one of said signal components with respect to the other for an interval of one period of the scan; normally transmitting only the relatively undelayed signal component; and whenever a drop in amplitude below said determined level is detected, transmitting only the portions of the delayed signal component which correspond in time relation to defective portions of the undelayed signal component.

12. The method of suppressing defects in a radio frequency television signal comprising scan periods, said method comprising the steps of: detecting a drop in amplitude of said radio frequency television signal below a determined level; dividing said radio frequency signal to provide two identical radio frequency signal components; delaying one of said signal components with respect to the other for an interval of one period of the scan; normally transmitting only the delayed signal component; and upon detection of said drop in amplitude, transmitting the next whole scan line of the relatively undelayed signal component in place of the next scan line of the delayed signal component.

13. Apparatus for suppressing drop-outs in television signals frequency modulated to represent video information before the information becomes demodulated, including:

control means responsive to the television signals to detect drop-outs in the signals and to provide control signals in accordance with such detection;

first circuit means having a stationary disposition and responsive to the television signal for normally passing the signals;

second circuit means including delay means having a stationary disposition and responsive to the television signals for delaying the signals by a particular time interval relative to the signals passing through the first circuit means;

switching means responsive to the signals from the first and second circuit means and from the control means for passing the signals from the first circuit means in the absence of the control signals from the control means and for passing the signals upon the production of such control signals by the control means; and means responsive to the signals passing through the switching means for obtaining a frequency demodulation of such signals to recover the television information.

14. Apparatus as set forth in claim 13 wherein the television signals represent successive horizontal lines of a picture and wherein the second circuit means delay the television signals by a time interval constituting an integral multiple of the time interval for one horizontal line relative to the signals passing through the first circuit means.

15. Apparatus for suppressing drop-outs in television signals frequency modulated to represent video information before the information becomes demodulated, including:

means responsive to the television signals to limit the amplitude of the signals;

means responsive to the television signals having limited amplitudes for detecting amplitude changes representing drop-outs in the television signals;

control means responsive to the amplitude changes detected by the last mentioned means for producing control signals representing such drop-outs;

first circuit means having a stationary disposition and responsive to the television signals for providing a first controlled delay in such signals;

second circuit means having a stationary disposition and responsive to the television signals for providing in such signals a second controlled delay greater by a particular time interval than the first controlled delay;

switching means responsive to the signals from the first and second circuit means and to control signals from the control means for passing the signals from the first circuit means in the absence of the control signals from the control means and for passing the signals from the second circuit means upon the occurrence of the control signals from the control means; and means responsive to the signals passing through the switching means for obtaining a frequency demodulation of such signals.

16. Apparatus as set forth in claim 15 wherein means are provided for adjusting the level as to the changes in amplitude at which the control means respond to the amplitude-limited television signals to produce the control signals and wherein means are provided to adjust the second controlled delay of the television signals relative to the first controlled delay.

17. Apparatus as set forth in claim 16 wherein a phase comparator is provided for comparing the phases of the signals passing through the first and second circuit means and means are operatively coupled to the phase comparator and the second circuit means for adjusting the phase of the second signals relative to that of the first signals in accordance with the comparison provided by the phase comparator.

References Cited

UNITED STATES PATENTS

| | | | |
|---|---|---|---|
| 2,353,631 | 7/1944 | Bliss | 178—6.6 |
| 2,996,576 | 8/1961 | Bolby | 178—6.6 |
| 3,152,223 | 10/1964 | Wessels | 178—6.6 |

JOHN W. CALDWELL, *Primary Examiner.*

DAVID G. REDINBAUGH, ROBERT L. GRIFFIN, *Examiners.*

R. M. HESS, H. W. BRITTON, *Assistant Examiners.*